US012808257B2

(12) United States Patent
Harrell

(10) Patent No.: US 12,808,257 B2
(45) Date of Patent: *Nov. 24, 2026

(54) SLIDING DOOR SEAL

(71) Applicant: Schlage Lock Company LLC, Carmel, IN (US)

(72) Inventor: K. James Harrell, Everett, WA (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/436,224

(22) Filed: Dec. 30, 2025

(65) Prior Publication Data

US 2026/0125948 A1 May 7, 2026

Related U.S. Application Data

(63) Continuation of application No. 18/436,567, filed on Feb. 8, 2024, now Pat. No. 12,509,937.

(51) Int. Cl.

| | |
|---|---|
| ***E06B 7/21*** | (2006.01) |
| ***E06B 7/215*** | (2006.01) |
| *E06B 7/20* | (2006.01) |

(52) U.S. Cl.

CPC ................ *E06B 7/21* (2013.01); *E06B 7/215* (2013.01); *E06B 2007/202* (2013.01)

(58) Field of Classification Search

CPC ................................................. E06B 2007/202

See application file for complete search history.

(56) References Cited

U.S. PATENT DOCUMENTS

| | | | | |
|---|---|---|---|---|
| 4,947,584 A * | 8/1990 | Wexler | E06B 7/215 49/311 |
| 9,688,290 B2 * | 6/2017 | Kim | B61D 19/005 |
| 11,118,395 B2 * | 9/2021 | Dintheer | E06B 3/46 |

(Continued)

FOREIGN PATENT DOCUMENTS

| | | | |
|---|---|---|---|
| CN | 105649509 A * | 6/2016 | E06B 7/215 |
| CN | 113982447 A * | 1/2022 | E06B 7/215 |

(Continued)

OTHER PUBLICATIONS

International Search Report; International Searching Authority; International Patent Application No. PCT/US2025/015253; Apr. 15, 2025; 2 pages.

(Continued)

*Primary Examiner* — Catherine A Kelly

(74) *Attorney, Agent, or Firm* — Taft Stettinius & Hollister LLP

(57) ABSTRACT

Certain embodiments of the present application relate to a sliding door system. An example sliding door system includes a frame, a sliding door, and a drop seal mechanism. The sliding door is mounted in the frame for sliding movement between an open position and a closed position. The drop seal mechanism is mounted within the sliding door, and has a deployed state in which the drop seal mechanism forms a seal with the frame, and a retracted state in which the drop seal mechanism does not form a seal with the frame. The frame comprises a projection configured to drive the drop seal mechanism from the retracted state to the deployed state as the sliding door slides from the open position to the closed position.

19 Claims, 6 Drawing Sheets

(56) References Cited

U.S. PATENT DOCUMENTS

| | | | | |
|---|---|---|---|---|
| 11,326,393 | B2 * | 5/2022 | Gosling | E05B 65/0811 |
| 11,753,863 | B2 * | 9/2023 | Comaglio | E06B 3/4654 49/306 |
| 11,976,508 | B2 * | 5/2024 | Egger | E05D 15/0621 |
| 12,509,937 | B2 * | 12/2025 | Harrell | E06B 7/21 |
| 2018/0320437 | A1 * | 11/2018 | Dintheer | E06B 7/215 |
| 2019/0136609 | A1 * | 5/2019 | Dintheer | E06B 3/46 |

FOREIGN PATENT DOCUMENTS

| | | | | | |
|---|---|---|---|---|---|
| DE | 20219081 | U1 | * | 3/2003 | E06B 7/20 |
| DE | 102016116197 | A1 | * | 3/2018 | E06B 7/20 |
| EP | 2476856 | A2 | * | 7/2012 | E06B 7/21 |
| EP | 3211170 | A1 | * | 8/2017 | E06B 7/215 |
| EP | 3825503 | A1 | * | 5/2021 | E06B 7/21 |
| KR | 20190130113 | A | * | 11/2019 | E06B 7/20 |
| KR | 20210149942 | A | * | 12/2021 | E06B 7/20 |
| KR | 20240001562 | A | * | 1/2024 | B63B 19/00 |

OTHER PUBLICATIONS

Written Opinion of the International Searching Authority; International Searching Authority; International Patent Application No. PCT/US2025/015253; Apr. 15, 2025; 7 pages.

Allegion; Zero International Automatic Door Bottoms Door Sealing Systems Catalog; 14 pages; www.zerointernational.com.

* cited by examiner

SLIDING DOOR SEAL

TECHNICAL FIELD

The present disclosure generally relates to seals for sliding doors, and more particularly but not exclusively relates to automatic drop seals for sliding doors.

BACKGROUND

Automatic drop seals are occasionally provided to doors to aid in generating a seal when the door is in the closed position. While automatic drop seals have been utilized in swing doors, these mechanisms often rely upon the large mechanical advantage provided at the hinge edge of the closure in order to effect the dropping of the seal. However, those skilled in the art will readily recognize that this mechanical advantage is not available in sliding doors, which has thus far hindered the advancement of drop seals in sliding doors. For these reasons among others, there remains a need for further improvements in this technological field.

SUMMARY

Certain embodiments of the present application relate to a sliding door system, comprising a frame, a sliding door, and a drop seal mechanism. The sliding door is mounted in the frame for sliding movement between an open position and a closed position. The drop seal mechanism is mounted within the sliding door, and has a deployed state in which the drop seal mechanism forms a seal with the frame, and a retracted state in which the drop seal mechanism does not form a seal with the frame. The frame comprises a projection configured to drive the drop seal mechanism from the retracted state to the deployed state as the sliding door slides from the open position to the closed position. Further embodiments, forms, features, and aspects of the present application shall become apparent from the description and figures provided herewith.

DETAILED DESCRIPTION OF ILLUSTRATIVE EMBODIMENTS

Figure 2:
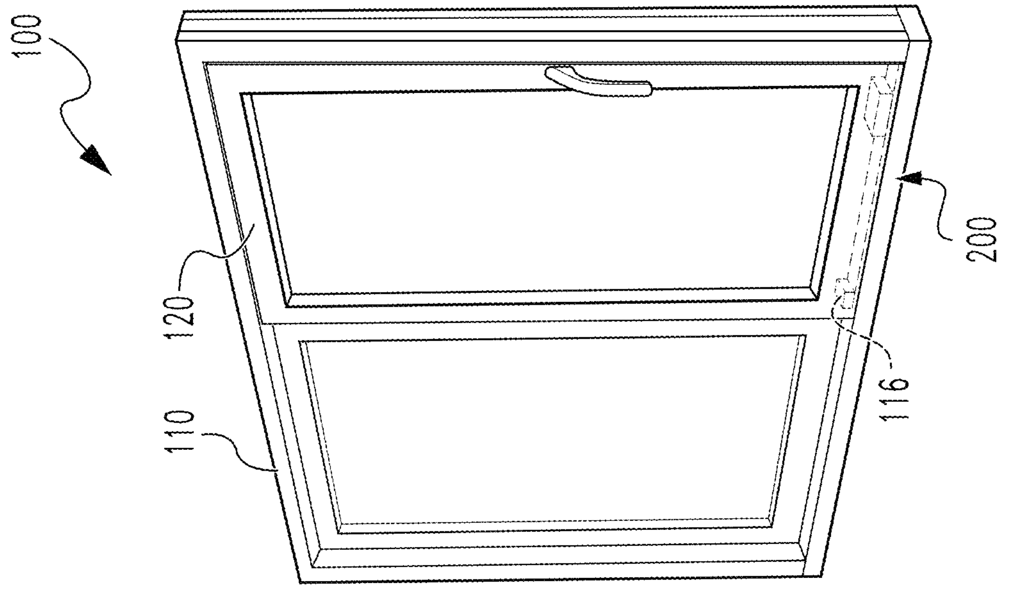
FIG. 2 is a perspective illustration of the closure assembly in a closed state.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" may be used to denote motion or spacing along three mutually perpendicular axes, wherein each of the axes defines two opposite directions. In the coordinate system illustrated in FIG. 3, the X-axis defines first and second longitudinal directions, the Y-axis defines first and second lateral directions, and the Z-axis defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. Moreover, the term "transverse" may also be used to describe motion or spacing that is non-parallel to a particular axis or direction. For example, an element that is described as being "movable in a direction transverse to the longitudinal axis" may move in a direction that is perpendicular to the longitudinal axis and/or in a direction oblique to the longitudinal axis. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, it should be appreciated that the inclusion of a structural or method feature in a particular figure is not meant to imply that such feature is required in all embodiments and, in some embodiments, may be omitted or may be combined with other features.

Figure 1:
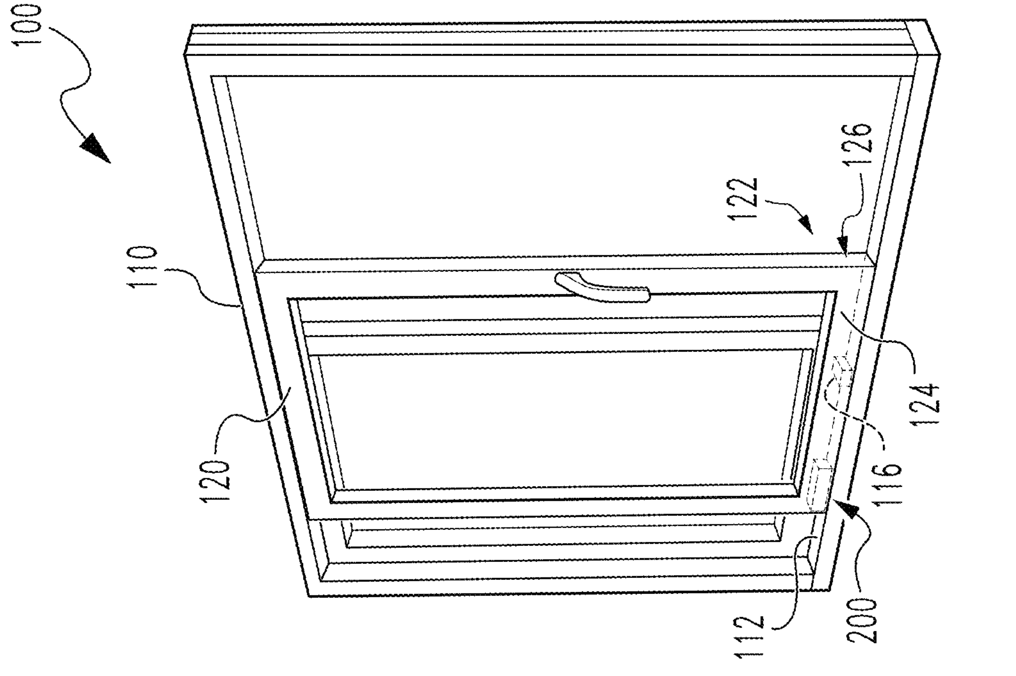
FIG. 1 is a perspective illustration of a closure assembly according to certain embodiments in an open state.

With reference to FIGS. 1 and 2, illustrated therein is a sliding door closure assembly 100 according to certain embodiments. The closure assembly 100 generally includes a frame 110 and a door 120 slidably mounted to the frame 110. The frame 110 generally includes a bottom track 112 that slidably receives a bottom edge 124 of the door 120 and aids in guiding the door 120 for sliding movement between an open position (FIG. 1) and a closed position (FIG. 2). As described herein, the frame 110 may include a projection 116 that projects upward from a floor of the bottom track 112 and into a channel 126 formed in the bottom edge 124 of the door 120.

The door 120 is slidably mounted in the frame 110, and generally includes a lower region 122 including the bottom edge 124. A drop seal mechanism 200 is positioned within the lower region 122, and is operable to be actuated by the projection 116. The drop seal mechanism 200 has a withdrawn or retracted state in which the drop seal mechanism 200 does not form a seal with the bottom track 112, and a deployed state in which the drop seal mechanism 200 forms a seal with the bottom track 112. As described herein, the drop seal mechanism 200 is configured to adopt the retracted state when the door 120 is in the open position (FIG. 1), and to adopt the deployed state when the door 120 is in the closed position (FIG. 2).

Figure 3:
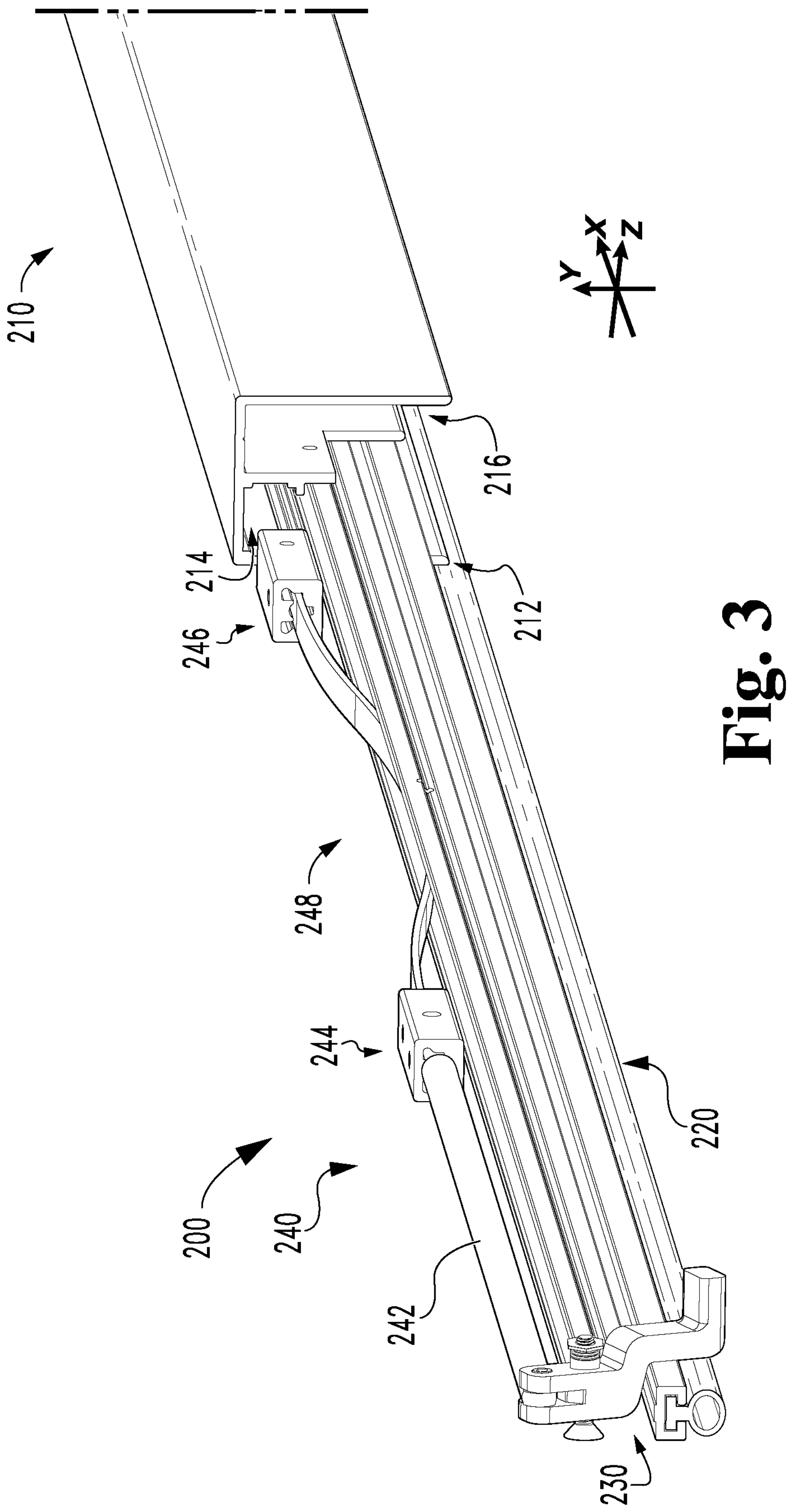
FIG. 3 is a partially exploded view of a drop seal mechanism according to certain embodiments.

With additional reference to FIG. 3, the drop seal mechanism 200 generally includes a channel member 210, a seal member 220 movably mounted in the channel member 210, an actuation lever 230 pivotably mounted in the channel member 210, and a transmission 240 engaged between the seal member 220 and the actuation lever 230. As described herein, the transmission 240 is configured to move the seal member 220 between a withdrawn position and a deployed position in response to movement of the actuation lever 230 between an unactuated position and an actuated position.

Figure 4:
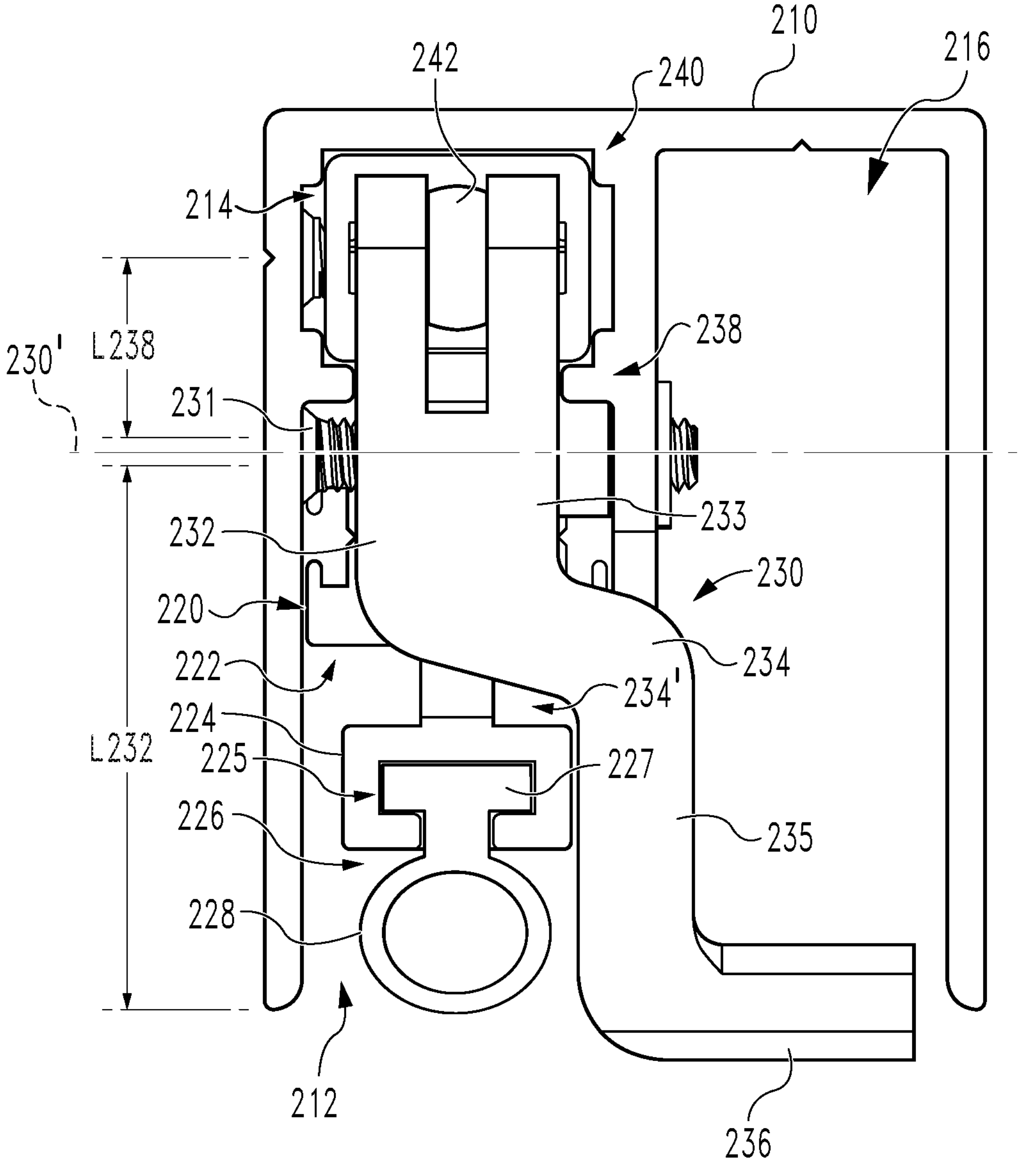
FIG. 4 is an end view of the drop seal mechanism.

With additional reference to FIG. 4, the channel member 210 is configured for mounting within the channel 126, and generally includes a seal channel 212 in which the seal member 220 is movably mounted, a transmission channel 214 in which the transmission 240 is mounted, and a receiving channel 216 that slides along the projection 116 during opening and closing of the door 120.

Figure 6:
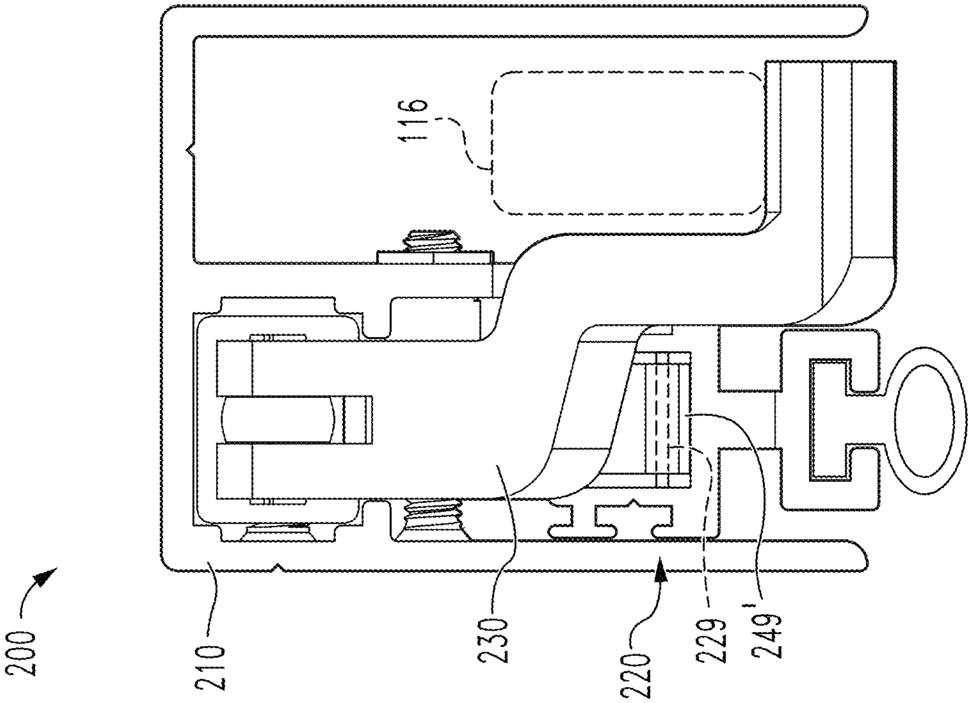
FIG. 6 is an end view of the drop seal mechanism in a deployed state.
Figure 5:
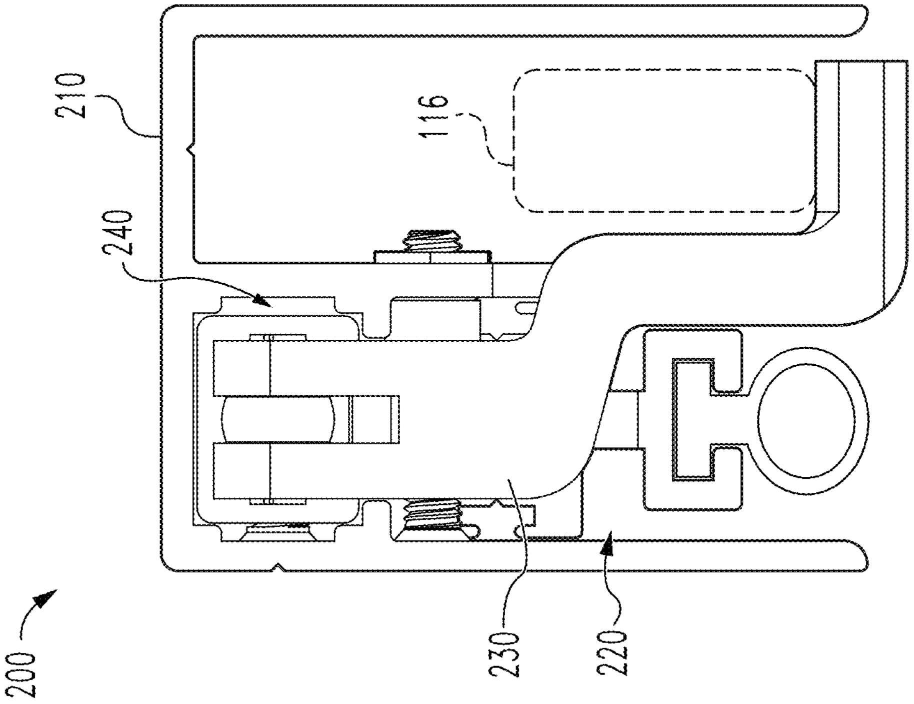
FIG. 5 is an end view of the drop seal mechanism in an withdrawn state.

With additional reference to FIGS. 5 and 6, the seal member 220 is movably seated in the seal channel 212 for vertical movement between a withdrawn position (FIG. 5) and a deployed position (FIG. 6). In the illustrated form, the seal member 220 generally includes a body portion 222, a mounting portion 224 depending from the body portion 222, and a seal strip 226 mounted to the mounting portion 224. In the illustrated form, the seal member 220 includes a cutout 221 that causes the mounting portion 224 to extend beyond the end of the body portion 222, which may include a transmission receiving channel 223 operable to receive a portion of the transmission 240. As described herein, the cutout 221 may be provided to accommodate a portion of the actuation lever 230 while ensuring that the seal provided by the drop seal mechanism 200 extends along substantially the entire length of the door 120 (e.g., at least 90% or at least 95% of the length of the door 120 along the direction of sliding movement).

The mounting portion 224 may include a mounting channel 225, and the seal strip 226 may include a corresponding mounting portion 227 configured for receipt in the mounting channel 225. For example, each of the mounting channel 225 and the mounting portion 227 may have generally T-shaped cross-sections to facilitate the sliding insertion of the mounting portion 227 into the mounting channel 225. The seal member 226 may include a seal portion 228 depending from the mounting portion 227 and configured to form a seal with a floor (e.g., the bottom track 112 of the frame 110). While the illustrated seal portion 228 is generally elliptical, it should be appreciated that seal portions according to other embodiments may have other geometries. As described herein, the seal member 220 is configured to engage the bottom track 112 when in the deployed position to thereby form a seal at the bottom of the door 120. When in the withdrawn position, the seal member 220 is disengaged from the bottom track 112 to facilitate the sliding movement of the door 120 while reducing the likelihood of damage to the seal member 220.

Figure 7:
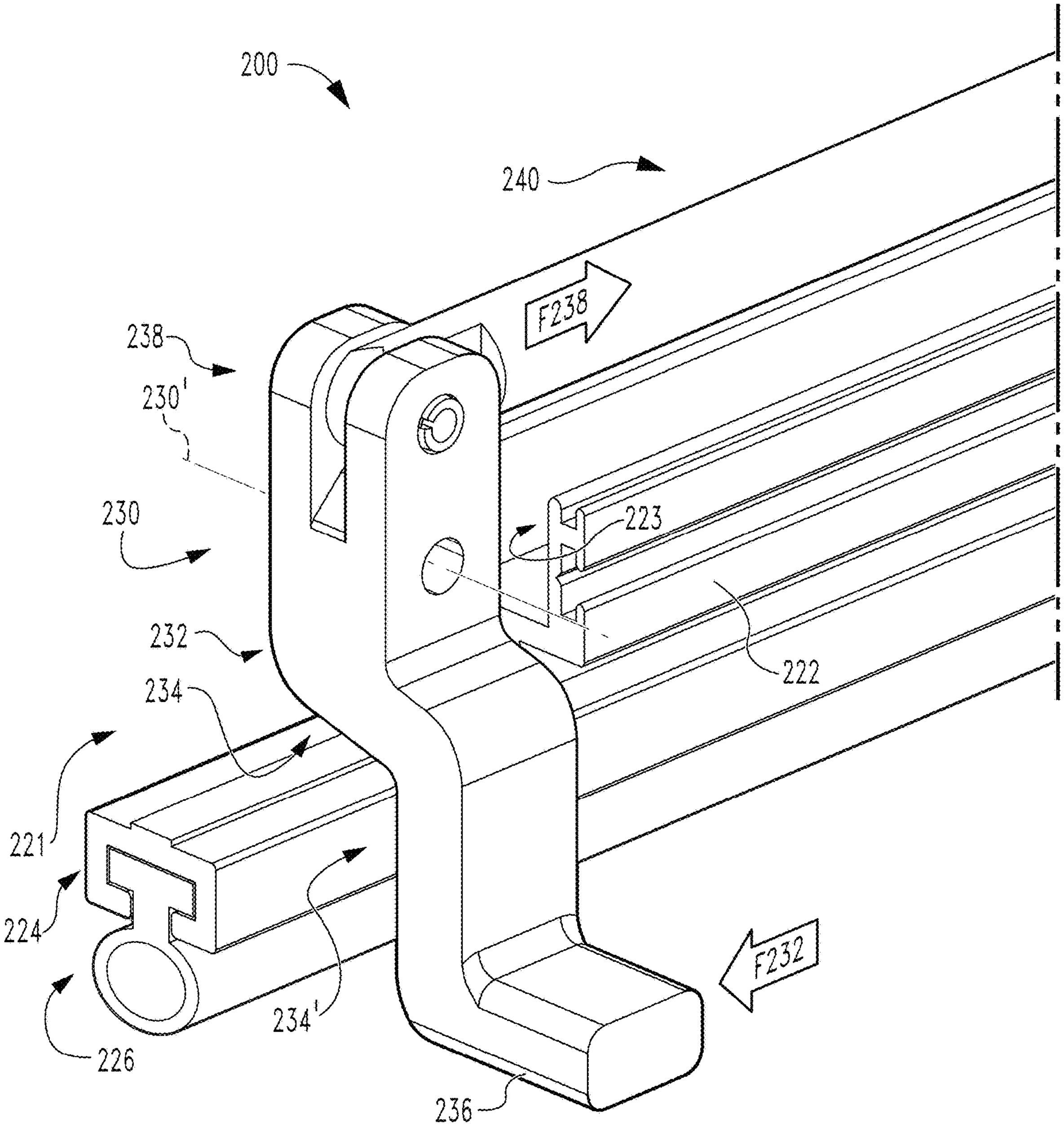
FIG. 7 is a perspective illustration of a portion of the drop seal mechanism.
Figure 8:
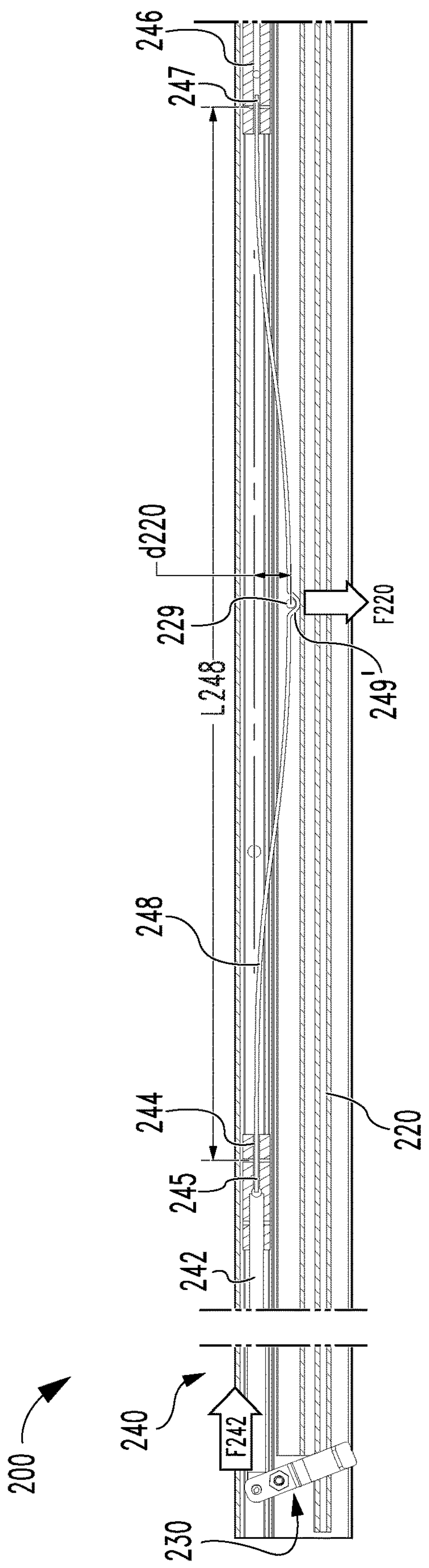
FIG. 8 is a cross-sectional view of the drop seal mechanism in the withdrawn state.
Figure 9:
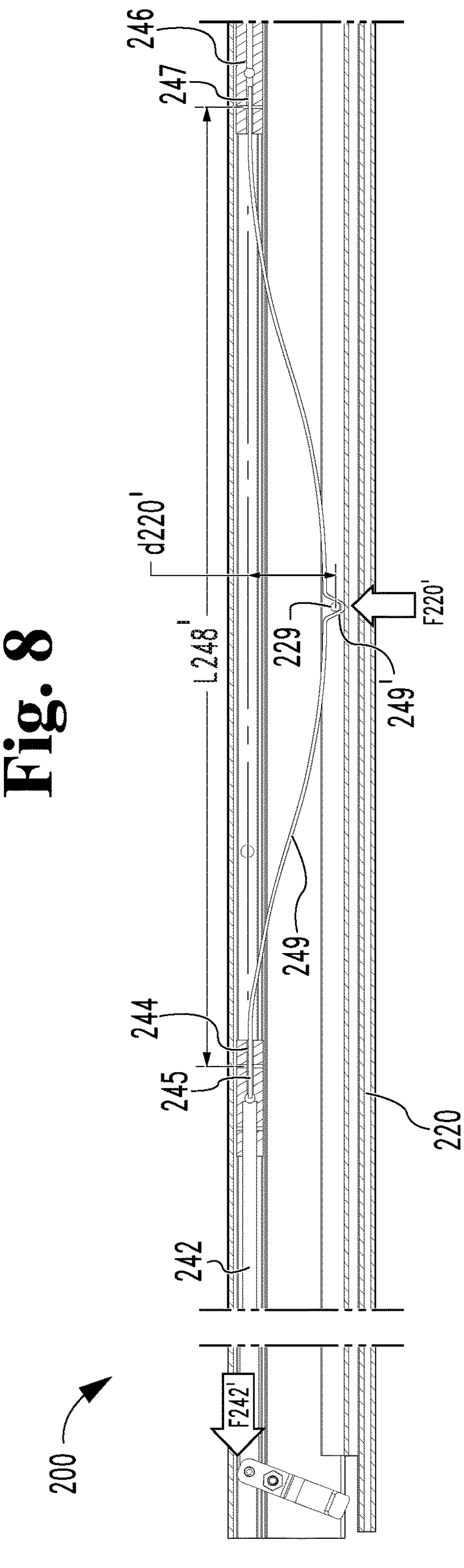
FIG. 9 is a cross-sectional view of the drop seal mechanism in the deployed state.

With additional reference to FIG. 7, the actuation lever 230 is pivotably mounted in the channel member 210 for pivotal movement between an unactuated position (FIG. 8) and an actuated position (FIG. 9). For example, the lever 230 may be mounted for pivotal movement about an axle 231 that is mounted to the channel member 210. As described herein, the actuation lever 230 is engaged with the seal member 220 via the transmission 240 such that the seal member 220 moves between the withdrawn position and the deployed position in response to movement of the actuation lever 230 between the unactuated position and the actuated position.

The actuation lever 230 is mounted for pivotal movement about a pivot axis 230' defined by the axle 231, and generally includes an input arm 232 operable to engage the projection 116 and an output arm 238 coupled with a rod 242 of the transmission 240. The illustrated input arm 232 includes a first portion 233 accommodated within the cutout 221, a jog 234 connecting the first portion 233 with a second portion 235, and a foot 236 projecting from the second portion 235. The jog 234 extends in a direction of the pivot axis 230', and partially defines a void 234'. The void 234' allows the mounting portion 224 and seal strip 226 to extend beyond the end of the body portion 222 to thereby extend the effective length of the seal formed between the drop seal mechanism 200 and the frame 110. The effective length L232 of the input arm 232, measured from the axis 230' to the foot 236, is greater than the effective length L238 of the output arm 238, measured from the axis 230' to the point of engagement with the rod 242. As a result, the actuation arm 230 is configured to translate a lesser first force F232 on the foot 236 of the input arm 232 to a greater second force F238 exerted by the output arm 238 on the rod 242. As described herein, this force multiplication may reduce the amount of resistance that the user encounters during closing of the door 120.

With additional reference to FIGS. 8 and 9, the transmission 240 is configured to move the seal member 220 from the withdrawn position (FIGS. 5 and 8) to the deployed position (FIGS. 6 and 9) in response to movement of the actuation lever 230 from the unactuated position (FIG. 8) to the actuated position (FIG. 9). In the illustrated form, the transmission 240 generally includes a rod 242 connected with the actuation lever 230, a sliding block 244 connected with the rod 242 and slidably mounted within the transmission channel 214, a fixed block 246 secured to the channel member 210 within the transmission channel 214, and a leaf spring 248 connected between the sliding block 244 and the fixed block 246. The sliding block 244 is coupled with a first end 245 of the leaf spring 248, and the fixed block 246 is coupled with an opposite second end 247 of the leaf spring 248. The sliding block 244 and the fixed block 246 are longitudinally offset from one another by a distance that defines the effective longitudinal length of the leaf spring 248. The leaf spring 248 is provided with a curved portion 249 that extends away from the transmission channel 214 and into engagement with the seal member 220. In certain forms, the curved portion 249 may include a valley 249' that receives a pin 229 coupled to the seal member 220 to facilitate the movement of the seal member 220 from its deployed position to its retracted position.

FIG. 8 illustrates the drop seal mechanism 200 when the door 120 is in the open position. In this state, the actuation lever 230 is in its unactuated position, and the seal member 220 is in its withdrawn position. When in the withdrawn position, the seal member 220 is offset from the transmission channel 214 by a first offset distance d220. In certain forms, the first offset distance d220 may be measured from the transmission channel 214 in which the blocks 244, 246 are seated to the point of engagement between the valley 249' and the seal member 220. In such forms, the first offset distance d220 may be referred to as the lateral dimension of the leaf spring 248. Additionally, the sliding block 244 is offset from the fixed block 246 by a first distance corresponding to a first effective longitudinal length L248 of the leaf spring 248. As described herein, contraction of the longitudinal length dimension L248 generally results in expansion of the lateral dimension d220 and deployment of the seal member 220, and expansion of the longitudinal length dimension L248 generally results in contraction of the lateral dimension d220 and withdrawal of the seal member 220.

In order to transition the drop seal mechanism 200 from the retracted state (FIGS. 5 and 8) to the deployed state (FIGS. 6 and 9), the user may simply slide the door 120 from its open position (FIG. 1) to its closed position (FIG. 2). During closing movement of the door 120, the projection 116 engages the foot 236 and thereby applies a first force F232 to the input arm 232. This first force F232 causes the actuation lever 230 to pivot from its unactuated position (FIG. 8) to its actuated position (FIG. 9) while exerting on the transmission rod 242 a second force F238. The actuation lever 230 is configured to provide a mechanical force advantage such that the output force F238 is greater than the input force F232. The second force F238 causes the transmission rod 242 to drive the sliding block 244 toward the fixed block 246, thereby reducing the effective longitudinal length of the leaf spring 248 from a first effective length L248 (FIG. 8) to a second effective length L248' (FIG. 9). Because the true length of the leaf spring 248 remains relatively constant, the leaf spring 248 deforms such that the curved portion 249 flexes downward as a result of the reduced effective length L248'. As a result of this flexing, the leaf spring 248 drives the seal member 220 downward from its withdrawn position (FIG. 8) to its deployed position (FIG. 9).

FIG. 9 illustrates the drop seal mechanism 200 when the door 120 is in the closed position. In this state, the actuation lever 230 is in its actuated position, and the seal member 220 is in its deployed position. When in the deployed position, the seal member 220 is offset from the transmission channel 214 by a second offset distance d220' greater than the first offset distance d220. Additionally, the sliding block 244 is offset from the fixed block 246 by a second distance corresponding to the second effective longitudinal length L248' of the leaf spring 248. As noted above, the leaf spring 248 is in a deformed state when the drop seal mechanism 200 is in its deployed state. Accordingly, the leaf spring 248 exerts a bias force urging the actuation lever 230 toward its unactuated position. As long as the door 120 remains in its closed position, however, the projection 116 maintains the actuation lever 230 in its actuated position.

In order to transition the drop seal mechanism 200 from the deployed state (FIGS. 6 and 9) to the withdrawn state (FIGS. 5 and 8), the user may simply slide the door 120 from its closed position (FIG. 2) to its open position (FIG. 1). During opening movement of the door 120, the projection 116 disengages from the foot 236, and thereby permits the leaf spring 248 to drive the actuation lever 230 toward its unactuated position as the leaf spring 248 returns to a less-deformed state. Such return of the leaf spring 248 to the less-deformed state causes the valley 249' to move upward, thereby driving the pin 229 upward such that the seal member 220 returns to its retracted position (FIG. 8).

In the illustrated form, the transmission 240 comprises a leaf spring 248 configured to translate longitudinal forces on the rod 242 to lateral forces on the seal member 220. More particularly, a proximal force F242 on the rod 242 (e.g., in response to the projection 116 driving the actuation lever 230 to its actuated position) results in a downward force F220 on the seal member 220. When the leaf spring 248 is deformed, the leaf spring 248 exerts a distal force F242' on the rod 242, and exerts an upward force F220' on the seal member 220. As the actuation lever 230 moves to its unactuated position (e.g., during opening movement of the door 120), the forces F242', F220' drive the seal member 220 toward its withdrawn position.

While one form of transmission 240 is illustrated in the drawings, it should be appreciated that other forms of transmission may be utilized to translate a longitudinal (e.g., horizontal) force exerted by the actuation lever 230 to a lateral (e.g., vertical) force on the seal member 220. As one example, the transmission 240 may instead one or more ramps and/or one or more cams that cause the seal member 220 to move between its withdrawn position and its deployed position in response to movement of the actuation lever 230 between its unactuated position and its actuated position.

Although other forms of transmission are contemplated, it should be appreciated that the illustrated embodiment may provide one or more advantages that may not necessarily be present in other embodiments. By way of illustration, it has been found that the illustrated transmission 240 may reduce or eliminate the need for precise adjustment of the parts relative to one another. For example, if the actuation lever 230 is pushed while the seal is fully pressed against the ground, the leaf spring 248 can simply flex to take up some of the slop and reduce the necessity for adjustment.

From the foregoing description, it should be evident that in the illustrated form, the working components of the drop seal mechanism 200 are wholly concealed within the door 120. This is in contrast to certain existing sliding door drop seal mechanisms, which require that an actuator extend from the door to actuate the drop seal. As will be appreciated by those skilled in the art, such an arrangement can pose hazards related to tripping and/or catching items on the actuator. As such, in addition to providing the aesthetic advantages of providing a door that does not appear to have been modified, the provision of a drop seal mechanism that is concealed within the door 120 may provide functional advantages not available in existing devices.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A seal mechanism for a sliding door, the seal mechanism comprising:

a mount configured for engagement with the sliding door;

a seal movably engaged to the mount for movement between a withdrawn position and a deployed position;

a lever pivotably engaged to the mount for pivotal movement about a pivot axis between a first position and a second position, wherein the lever comprises an input portion positioned on a first side of the pivot axis, and wherein the lever comprises an output portion positioned on a second side of the pivot axis opposite the first side; and a transmission configured to move the seal between the withdrawn position and the deployed position in response to movement of the lever between the first position and the second position, wherein the transmission comprises a rod pivotably coupled to the output member, and a leaf spring engaged between the rod and the seal, and wherein the leaf spring causes the rod to urge the lever toward one of the first position and the second position.

2. The seal mechanism of claim 1, wherein the lever is configured to translate an input force exerted on the lever to an output force exerted onto the transmission.

3. The seal mechanism of claim 2, wherein the input force is exerted on the input portion of the lever;

wherein the output portion of the lever exerts the output force onto the transmission; and wherein the output force is greater than the input force.

4. The seal mechanism of claim 1, wherein the transmission comprises a leaf spring.

5. The seal mechanism of claim 4, wherein the leaf spring comprises a curved portion;

wherein the curved portion is configured to drive the seal toward the deployed position in response to a reduction in an effective longitudinal length of the leaf spring; and wherein the curved portion is configured to drive the seal toward the withdrawn position in response to an increase in the effective longitudinal length of the leaf spring.

6. The seal mechanism of claim 1, wherein the mount comprises a channel that extends in a longitudinal direction;

wherein the withdrawn position and the deployed position are offset from one another in a lateral direction transverse to the longitudinal direction; and wherein the transmission is configured to translate a longitudinal force exerted by the lever to a lateral force on the seal.

7. The seal mechanism of claim 1, wherein the first position of the lever comprises an unactuated position; and wherein the second position of the lever comprises an actuated position.

8. The seal mechanism of claim 1, wherein the input member includes a first portion extending away from the pivot axis and a foot extending in a direction of the pivot axis.

9. A sliding door system, comprising:

a frame;

a sliding door slidably mounted to the frame; and a seal member mounted to the sliding door and having a deployed state in which the seal member forms a seal with the frame, and a retracted state in which the seal member does not form a seal with the frame;

wherein the frame is configured to drive the seal member from the retracted state to the deployed state as the sliding door slides from an open position to a closed position; and wherein the seal member comprises a lever pivotably mounted to the sliding door for movement between an unactuated position and an actuated position, and a rod pivotably connected with the lever.

10. The sliding door system of claim 9, wherein the seal member is mounted for movement between a withdrawn position and a deployed position; and wherein the sliding door system further comprises a transmission configured to move the seal member between the withdrawn position and the deployed position in response to movement of the lever between an unactuated position and an actuated position.

11. The sliding door system of claim 10, wherein the transmission further comprises a leaf spring extending in a longitudinal direction;

wherein the leaf spring comprises a curved portion extending at least partially in a lateral direction transverse to the longitudinal direction; and wherein contraction of the leaf spring in the longitudinal direction causes expansion of the leaf spring in the lateral direction to thereby urge the seal member from the withdrawn position to the deployed position.

12. The sliding door system of claim 9, wherein the seal member is concealed within the sliding door when in the retracted state.

13. The sliding door system of claim 9, wherein the lever is wholly concealed within the sliding door.

14. The sliding door system of claim 9, wherein the lever is configured to provide a mechanical force advantage such that a lesser input force exerted by a portion of the frame on the lever results in a greater output force exerted by the lever on the seal member.

15. A sliding door system, comprising:

a frame;

a sliding door slidably mounted to the frame, wherein the sliding door is configured to move in a first direction from an open position to a closed position; and a seal member mounted to the sliding door and having a deployed state in which the seal member forms a seal with the frame, and a retracted state in which the seal member does not form a seal with the frame;

wherein the seal member comprises a lever pivotably mounted to the sliding door for movement between an unactuated position and an actuated position; and wherein a portion of the frame is configured to drive the seal member from the retracted state to the deployed state as the sliding door slides from the open position to the closed position by exerting an input force onto the seal member at least primarily in a second direction opposite the first direction.

16. A method, comprising:

during sliding movement of a door within a frame in a first direction, causing a portion of the frame to exert a first force on a lever primarily in a second direction opposite the first direction; and in response to exertion of the first force on the lever, causing the lever to exert a second force on a transmission to drive a seal member from a withdrawn position, in which the seal member does not form a seal between the door and the frame, to a deployed position, in which the seal member forms a seal between the door and the frame.

17. The method of claim 16, wherein the second force is greater than the first force.

18. The method of claim 16, wherein the transmission comprises a leaf spring including a curved portion; and wherein causing the transmission to drive the seal member from the withdrawn position to the deployed position comprises reducing an effective longitudinal length of the leaf spring to thereby cause the curved portion to urge the seal member toward the deployed position.

19. The method of claim 16, wherein the lever comprises a void; and wherein a portion of the seal member travels within the void as the seal member moves between the withdrawn position and the deployed position.

* * * * *